July 18, 1939. J. H. FRIDÉN 2,166,209
SLUG HANDLING AND TREATING MECHANISM
Filed June 18, 1936 5 Sheets-Sheet 1

INVENTOR:
John H. Fridén
BY
his ATTORNEY.

July 18, 1939.  J. H. FRIDÉN  2,166,209
SLUG HANDLING AND TREATING MECHANISM
Filed June 18, 1936  5 Sheets-Sheet 2
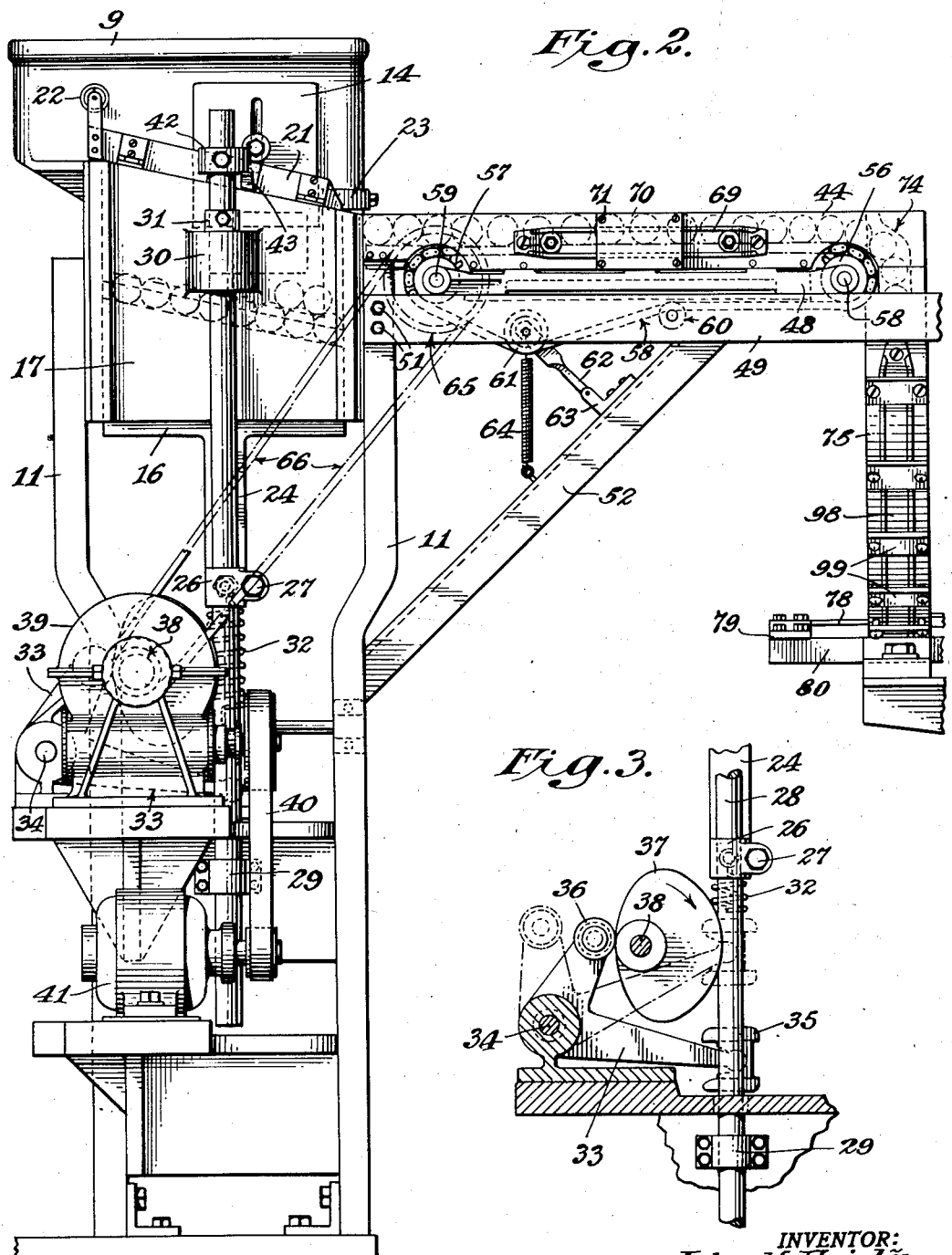

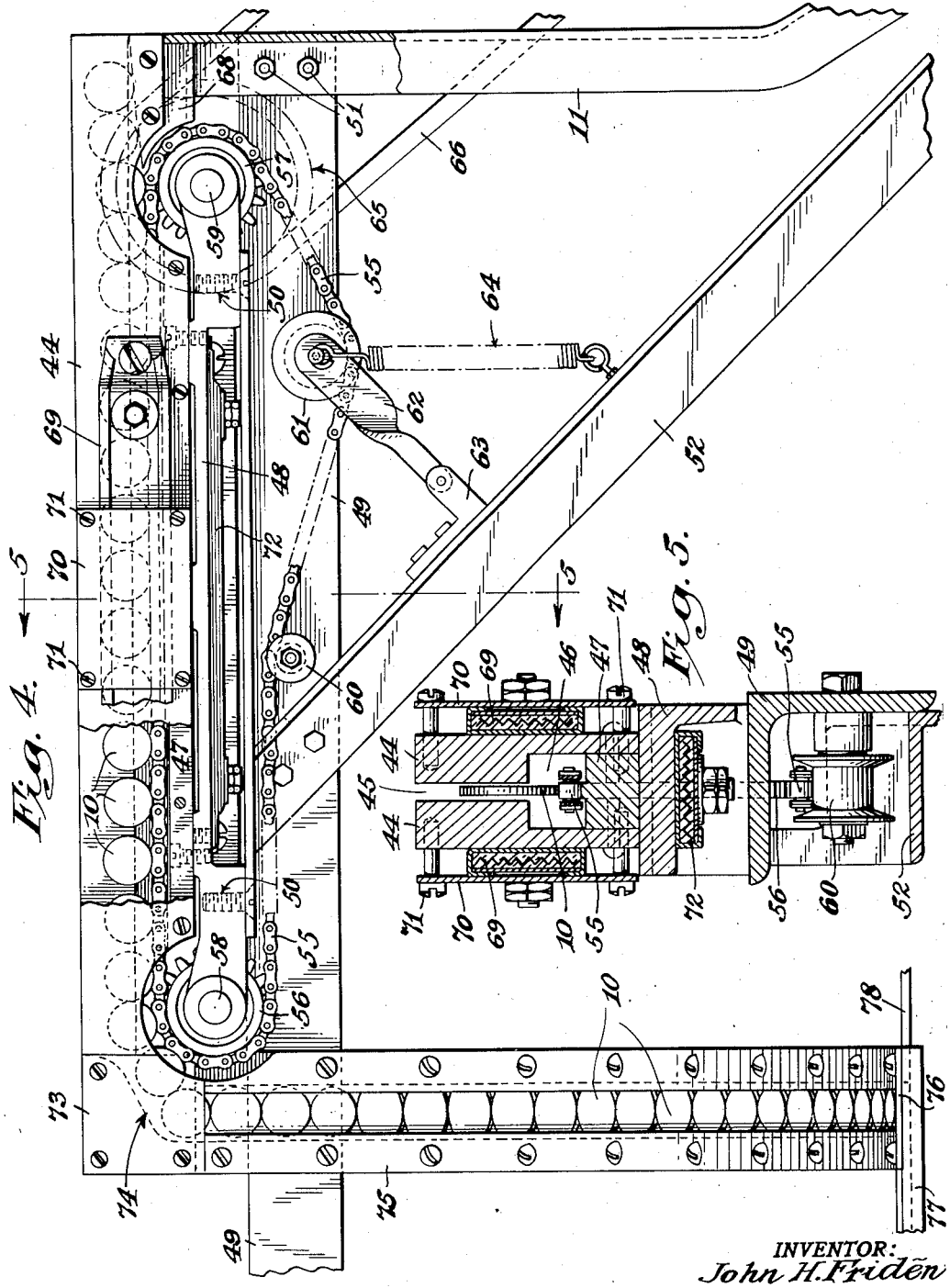

July 18, 1939.  J. H. FRIDÉN  2,166,209

SLUG HANDLING AND TREATING MECHANISM

Filed June 18, 1936  5 Sheets-Sheet 4

INVENTOR:
John H. Fridén
BY
his ATTORNEY

July 18, 1939.  J. H. FRIDÉN  2,166,209
SLUG HANDLING AND TREATING MECHANISM
Filed June 18, 1936   5 Sheets-Sheet 5
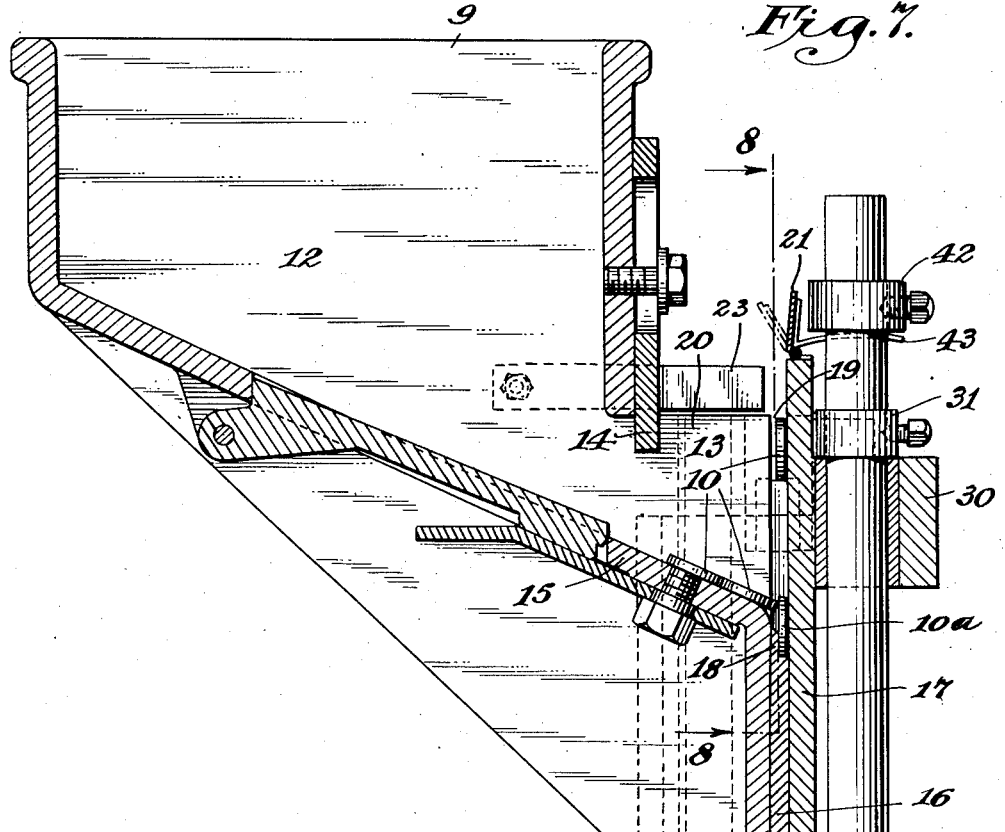
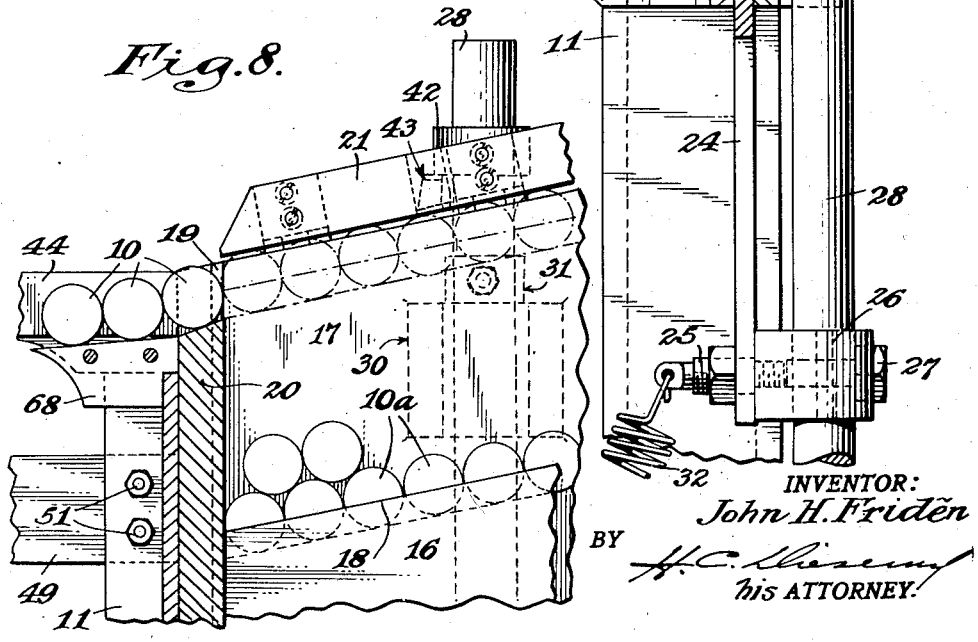
INVENTOR:
John H. Fridén
BY
his ATTORNEY.

Patented July 18, 1939

2,166,209

UNITED STATES PATENT OFFICE 2,166,209

SLUG HANDLING AND TREATING MECHANISM

John H. Fridén, Maplewood, N. J., assignor to The Sun Tube Corporation, Hillside, N. J., a corporation of New Jersey Application June 18, 1936, Serial No. 85,869

19 Claims. (Cl. 207—1)

This invention relates to mechanism for feeding or conveying flat, disc-like slugs from a hopper to any suitable point, such as the die of an extrusion press, and heating them in transit. It relates also to a novel method involved in such treatment of the slugs.

While the invention is capable of application to a wide variety of uses, it is particularly applicable to the handling of slugs used in the extrusion of zinc cups or tubes. Before extruding slugs of this character it is necessary to heat them to a suitable temperature at which the metal may be caused to flow under pressures which may be safely developed in an extrusion press. In order that the slugs may be delivered to the die at a substantially uniform temperature, it is either necessary or desirable that they be heated in transit and preferably up to a point reasonably close to the die. If any considerable variation exists in the temperature of the slugs as they are subjected to the extrusion operation, the product will not be uniform and should the slugs be too cold, there is danger that the punch might snap in attempting to extrude the slug.

In view of the necessity for heating zinc slugs, the problem of rapidly and reliably supplying the same to the die is considerably complicated. It has been an object of the present invention to develop slug-handling devices which will effectively and efficiently deliver slugs to a die at a uniform temperature and at a faster rate than has heretofore been possible. Previously it has not been considered possible to safely deliver uniformly heated slugs at the rate of more than about forty per minute but the present improvements enable such delivery at the rate of sixty or more per minute.

Other objects and advantages of the invention will appear from the following detailed description of an illustrative form of the same which will now be given in conjunction with the accompanying drawings, in which:

Fig. 2 is a front elevation of the hopper and associated devices.

Fig. 3 is a detail view in section along the line 3—3 of Figure 1, showing means for operating the slug feeding devices within the hopper.

Fig. 4 is an enlarged view, in rear elevation, of a portion of the slug feeding devices.

Fig. 5 is an enlarged, vertical section along the line 5—5 of Figure 4.

Fig. 7 is an enlarged, vertical section through the hopper and devices for feeding slugs therefrom, and Fig. 8 is a detail in vertical section along the line 8—8 of Figure 7.

Figure 1:
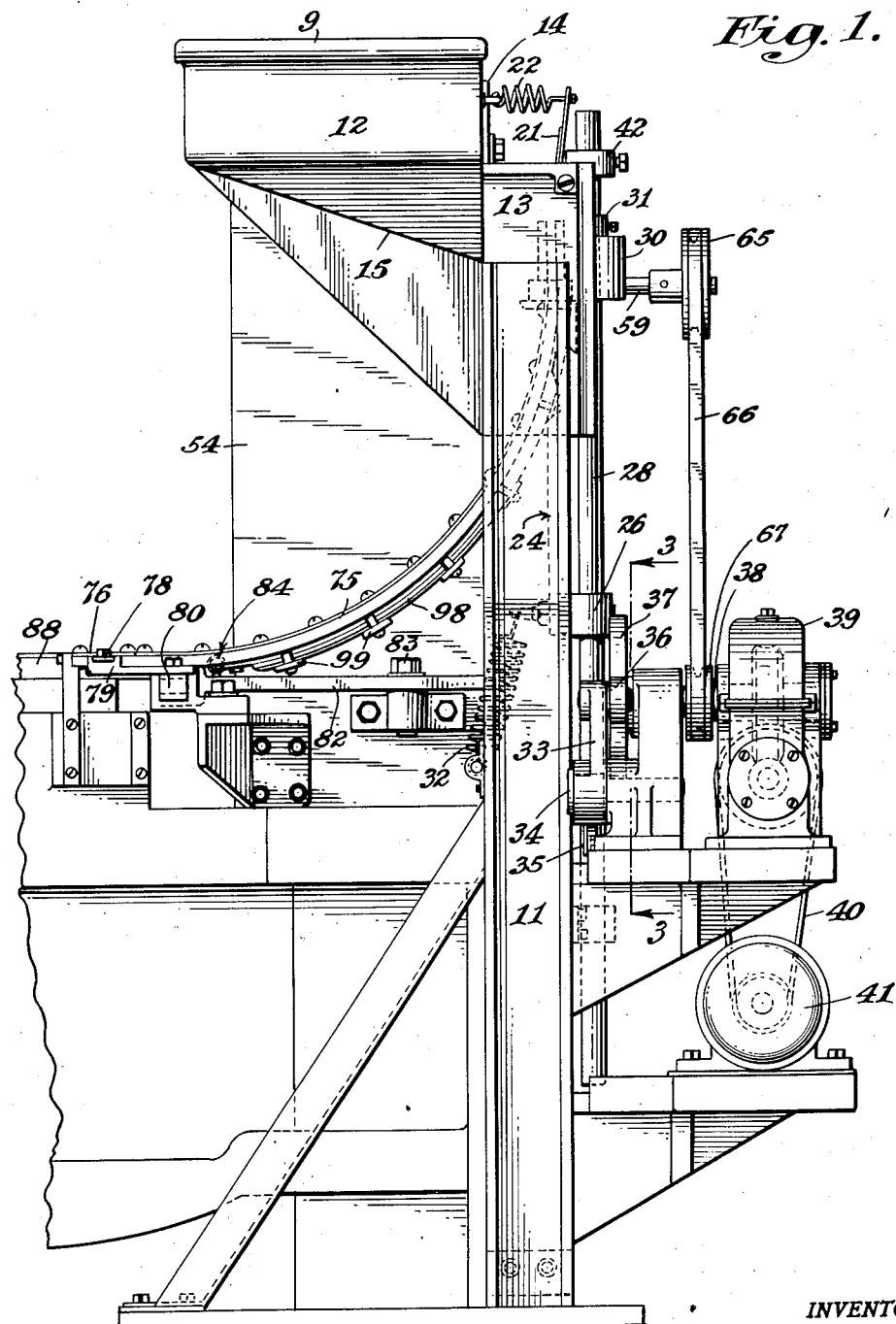
Fig. 1 is an end elevation of a hopper and associated devices for supplying slugs therefrom to an extrusion press, a fragmentary portion of which is also shown.

Referring now to the drawings, there is shown a hopper 9 arranged in an elevated position to hold a supply of slugs 10, only a few of which are shown. This hopper is carried by a frame structure 11 and may suitably be of a construction similar to that illustrated in my prior Patent No. 2,023,879, granted December 10, 1935. It is formed with a main compartment 12 and a small, auxiliary compartment 13 separated by an adjustable gate 14. The two compartments have a common sloping bottom 15 inclined at somewhat more than the angle of repose of the slugs. A considerable quantity of the slugs may be provided in the compartment 12 while a relatively small number will be held in compartment 13, into which they are continuously fed from the main compartment as they are withdrawn for use.

At the forward end of compartment 13 a vertically reciprocating slide 16 is provided. This slide has its upper edge inclined at a suitable angle to permit the slugs to roll freely when they are picked up, in the manner to be explained. The slide is reciprocated, by connections to be described, from the full-line position shown in Figure 8 to the dot-and-dash position of that figure. When in its lowermost position its upper edge is slightly below the lower end of the bottom 15 so that a number of slugs, properly presented, will drop into the position of the one designated 10a in Figure 7. As the slide is now elevated, these slugs will be retained between the forward wall 17 of the hopper and an upwardly projecting portion 18 of the slide. When the slide reaches the upper position (Figure 8), the slugs are brought in line with a passage 19 through the wall 20 of the hopper and at this time as many of the slugs as may be accommodated by the feeding devices, to be later explained, will roll through the passage 19. Any slugs which cannot be accommodated will simply be carried down again with the slide and will be elevated once more upon the next operation of the slide. This arrangement is more than adequate to supply slugs at a desired rate to the subsequent portions of the equipment. At the upper end of the wall 17 there is pivotally mounted a plate 21 adapted to be rocked from the full-line to the broken-line position of Figure 7. A spring 22 (Figure 2) normally urges the plate into the broken-line position while means, to be presently described, serve to rock the plate into the full-line position. The purpose of this plate is to push back into the compartment 13 any slugs which may be improperly carried up on the upper edges of the slugs properly retained by the slide. A guard 23 secured to the side of the hopper also assists in this operation.

Operation of the slide 16 is effected in the following manner. A downward extension 24 of the slide is attached by a bolt 25 to a collar 26 which in turn is attached by a bolt 27 to a vertically reciprocable rod 28. This rod is held and guided by a pair of brackets 29 and 30. A collar 31 secured to the rod engages the bracket 30 to limit the downward movement of the rod under the influence of a spring 32 connected at one end to the bolt 25 and at its other end to a portion of the frame. The rod is lifted, against the action of spring 32, by means of a bell crank 33 pivoted at 34 on the frame. The longer arm of this bell crank has a rounded end fitted into a bearing member 35 carried by a slot in the rod 28. The shorter arm of the bell crank carries a roller 36 which is urged, by the spring 32, against a cam 37 secured to a shaft 38. This shaft is driven through a speed reducer 39 connected by a belt 40 with the shaft of a motor 41. It will be seen, therefore, that upon each revolution of the shaft 38 the slide 16 will be reciprocated between the two positions indicated in Figure 8. At the same time the plate 21 is rocked. For this purpose the rod 28 carries a collar 42 having a portion arranged to engage a tail 43 extending from the plate when the rod is in its lower position. As the rod rises the spring 22 is permitted to rock the plate over the slide 16 and as the rod descends, the collar 42 again engages the tail 43 to restore the plate to the full-line position of Figure 7. Tail 43 is out of the path of collar 31 and is, therefore, not engaged by the latter.

As the slugs are discharged from the hopper through the opening 19, they pass between a pair of guide members 44 which are spaced slightly to provide a passage 45 of slightly greater width than the slugs. The lower portions of the members 44 are cut away to provide a larger, longitudinal passage 46. A long bar or block 47 carried by a casting 48 and secured thereto in any suitable way, as by means of the screws shown in Fig. 4, is disposed between the members 44 and provides the means for securing these members to the frame. The casting 48 rests upon the horizontal leg of an angle iron 49. This horizontal leg of the angle iron extends for only a limited portion of the length of the entire iron. Screws 50 at the opposite ends of the horizontal leg serve to retain the casting 48 in appropriate position. Angle iron 49 may be supported in any convenient way, as by securing one end of the same, by means of bolts 51, to a vertical portion of the frame 11. At another point the angle iron is supported by a strut 52 extending upwardly at an angle from the frame 11. (See Figs. 2 and 4). Again, at its other end the vertical leg of the angle iron may be supported by a bolt 53 entering one of the standards 54 of the extrusion press, to which the feeding devices are shown applied.

Within the passage 46 there is arranged a chain 55 adapted to rest upon and slide along a ridge at the center of the block 47. This chain is supported at its ends by a pair of sprockets 56 and 57 mounted on shafts 58 and 59 carried by the castings 48 at opposite ends thereof. The upper portion of the chain travels directly from the sprocket 57 to the sprocket 56 along the block 47 while the lower portion of the chain, traveling in the opposite direction, passes over an idler pulley 60 and under a tensioning pulley 61 before returning to the sprocket 57. Tensioning pulley 61 is carried by an arm 62 pivoted to a bracket 63 carried by the strut 52. A spring 64 tensioned between the axis of the pulley 61 and a point on the strut 52 serves to apply a desired tension to the chain. For the purpose of driving the chain, a pulley 65 is secured to the shaft 59 and is driven by a belt 66 connected at its opposite end with a pulley 67 secured to the shaft 38. To support the slugs as they enter the passage between the members 44, and before they reach the chain 55, a block 68 is mounted with its upper edge inclined downwardly at a slight angle from the opening 19. It will be seen, therefore, that as the slide 16 elevates a number of slugs to the upper position indicated in Fig. 8, they will roll through the opening 19 along the top of block 68 onto the chain 55 and will be carried by the latter toward the left in Fig. 4.

In transit through the passage 45, the slugs are preferably heated, by means of electrical heating units 69, one of which is mounted upon the outer surface of each of the members 44. These heating units may be retained in any suitable way, as by means of the screws shown in Fig. 2, and also by means of clamping plates 70 attached to the members 44 by means of screws 71. The heating units may be of any suitable construction adapted to develop and efficiently transmit heat to the members 44 and through the latter to the passages 45 and 46. A similar heating unit 72 may be provided beneath the casting 48, if desired. Thus, the slugs will be supplied with heat from three sides and will be very quickly raised to a desired temperature. It will be understood that all of the heating units will be connected in a suitable way with an appropriate source of electricity. If desired, some other form of heater might be employed in lieu of the electric units.

Figure 6:
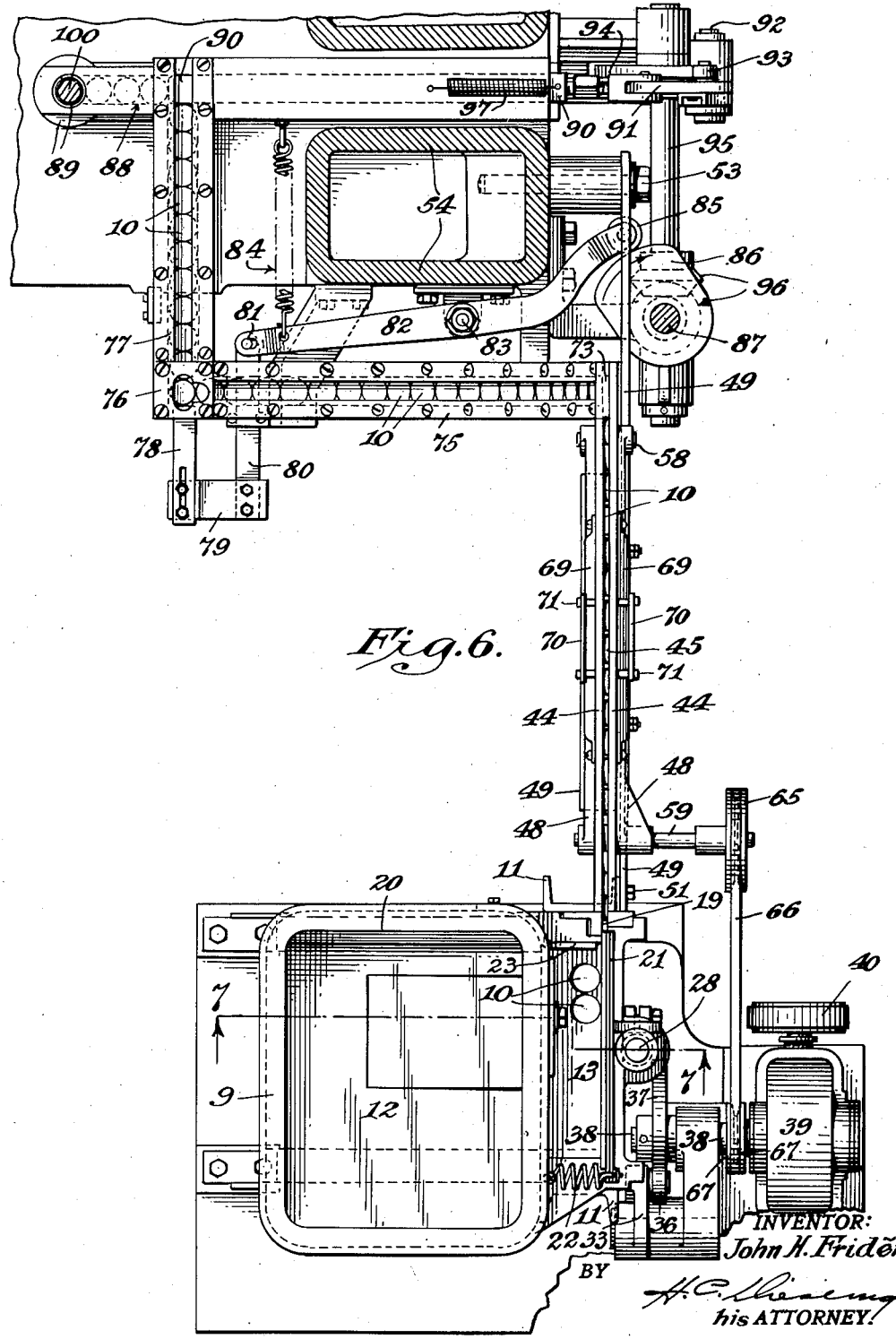
Fig. 6 is a top plan view of the hopper and associated feeding devices with a fragmentary portion of the press in section.

When the slugs are carried to the end of the chain supported by the sprocket 56, they are passed into a corner member 73 provided with a downwardly sloping channel 74. This channel communicates with the upper end of a curved chute 75. Chute 75 is preferably bent through an angle of about 90° so that its upper end is substantially vertical while its lower end is substantially horizontal, the curvature being, preferably, in such direction that the slugs will slide down the chute on their faces and will be presented in a horizontal plane at the lower end of the chute. From the lower end of the chute 75 the slugs are discharged into a corner piece 76, which has an opening alined with the chute and also has a passage alined with a horizontally disposed channel member 77 arranged at right angles to the chute 75. A slide 78 is arranged to be reciprocated within the corner piece 76 in line with the channel 77. This slide is connected by a cross-piece 79 with a slide 80, whose opposite end has a pin and slot connection 81 with the end of a two-armed lever 82. This lever is pivotally mounted on the frame of the extrusion press at 83 and is urged in a clockwise direction (Figure 6) by means of a spring 84. A roller 85 mounted on the opposite end of the lever is urged by the spring 84 into engagement with a cam 86 secured to a shaft 87, which may be driven in any suitable way (not shown) from the main operating shaft of the extrusion press. The arrangement is such that upon each operation of the press the plunger 78 will be reciprocated to force the slugs a distance of one diameter along the channel 77. As the slugs are fed in this way through the channel 77, they are brought one by one into line with a guide passage 88 arranged at right angles to channel 77 and terminating at the opening in the die 89. A plunger 90 is reciprocated in line with the passage 88 and serves to transfer the slugs, one at a time, into the die opening. For the purpose of operating the slide 90, its right end (Fig. 6) is pivotally connected, through a pin and slot, with an arm 91 carried by a pivot 92. Arm 91 carries a roller 93 engaging the periphery of a cam 94 secured to a shaft 95, which is driven from the shaft 87 through a pair of bevel gears 96. A spring 97, attached to the slide 90, urges the latter toward the left and thus maintains the roller 93 in engagement with the cam 94. It will be understood that the slides 78 and 90 are so synchronized in their operations that the slide 90 will be retracted when the slide 78 is operated to force another slug into line with the slide 90. Furthermore, slide 90 will be operated toward the left (Fig. 6) after the punch 100 of the extrusion press has been withdrawn from the die 89 and is in an elevated position.

On the under surface of the curved chute 75 there is preferably provided a curved heating unit 98 secured to the chute in any convenient way, as by means of clamping elements 99. Another heating unit (not shown) may, if desired, be provided beneath the channel member 77 so as to impart heat to the slugs up to the point at which they are shifted by the slide 90. These heating units, if electrical, may be connected with the same current source as the other heating units.

Thermostatic means, not shown, may be provided, if desired, to regulate operation of the heating units, particularly the one associated with the channel member 77 and preferably, also, unit 98. In this way delivery of the slugs to the die at a substantially uniform temperature can be definitely and automatically assured.

It is believed that the operation of the machine will be clear from the foregoing, detailed description. However, for convenience, a brief résumé of its operation will be given:

The hopper 9 is filled from time to time with a large quantity of slugs sufficient to maintain the machine in continuous operation for a considerable period. These slugs are fed by gravity into the compartment 13, from which they are picked up, one or more at a time, by means of the slide 16. This slide is reciprocated with sufficient frequency to insure delivery of an adequate supply of the slugs to the chain 55. As the slugs are delivered to this chain, at the right end of Fig. 4, they are carried along with the chain toward the left and then deposited into the upper end of the chute 75. Preferably, the chain will be operated at a speed sufficient to deliver the slugs at a faster rate than they can be handled by the extrusion press or other machine to which they are delivered. For example, if the press is capable of extruding 60 slugs per minute, the chain will preferably move at a rate to deliver 70 slugs per minute. This, of course, necessitates some slippage between the chain and the slugs as the latter are prevented from entering the chute 75. As the slugs are conveyed by the chain through the passage formed between members 44, heat is applied to them by means of the heating units 69 and 72, which serve to materially raise their temperature. Heating of the slugs is continued as they descend the chute 75 by gravity. As they reach the end of this chute they are brought in line with the slide 78, which is reciprocated once upon each operation of the press to shift a new slug into the path of the slide 90. This slide in turn subsequently shifts a new slug into the opening of the die 89. If no heat is added to the slugs in transit through the channel member 77, they must be heated to a temperature somewhat higher than the desired extrusion temperature by the time they reach the bottom of the chute 75. However, if additional heat is added in the channel 77, the temperature of the slugs on leaving the latter may be very nearly that desired for extrusion inasmuch as they will have only a few seconds in which to lose heat upon leaving the channel 77. It will be understood that a punch 100, is reciprocated into and out of the die 89 to effect extrusion and any suitable means may be provided for stripping the extruded tubes or cups from the punch and delivering them to a conveyor or a receptacle of suitable character.

While an illustrative machine embodying the invention has been disclosed in considerable detail, it will be understood that numerous variations may be made in the construction and arrangement of the various parts without departing from the general spirit and scope of the invention. The slug supplying and feeding mechanism may, as previously stated, be used in conjunction with a machine other than an extrusion press and some of the advantages of the invention may be derived without the provision of heating the slugs in transit. The terms and expressions used herein have been used as terms of description and not of limitation.

What I claim is:

1. In a machine of the class described a hopper for substantially flat disc-like slugs, a continuously traveling conveyor, means for lifting slugs intermittently from said hopper and delivering the slugs by gravity endwise to said conveyor, heating means associated with said conveyor for heating the slugs in transit edgewise thereon, a chute for receiving said slugs from the conveyor, and means for delivering the slugs one by one from said chute to a point of use.

2. In a machine of the class described a hopper for substantially flat disc-like slugs, a conveyor, means for lifting slugs intermittently from said hopper and delivering the slugs by gravity edgewise to said conveyor, heating means associated with said conveyor for heating the slugs in transit edgewise thereon, a chute for receiving said slugs from the conveyor, means for heating the slugs in transit through said chute, and means for delivering the slugs one by one from said chute to a point of use.

3. In a machine for extruding substantially flat disc-like slugs into hollow articles, a hopper for said slugs, an endless conveyor, means for delivering said slugs intermittently from said hopper edgewise to said conveyor means for continuously advancing said conveyor, a chute for receiving said slugs edgewise from the conveyor, and reciprocating means for delivering the slugs one by one from said chute to a point of use.

4. In a machine for extruding substantially flat disc-like slugs into hollow articles, a hopper for said slugs, a conveyor, means for delivering said slugs intermittently from said hopper edgewise to said conveyor, a chute for receiving said slugs edgewise from the conveyor, reciprocating means for delivering the slugs one by one from said chute to a point of use, and means for operating said conveyor and said reciprocating means, said conveyor being operated at a speed more than adequate to keep pace with said reciprocating means.

5. In a machine for automatically extruding a succession of zinc slugs into individual articles, an oven having an elongated channel therethrough, an endless conveyor traveling through said oven, means for delivering flat, disc-like slugs while on edge to said conveyor at one end of said oven, means for receiving the slugs from said conveyor at the other end of the oven, and means operable upon each cycle of operation of the machine for delivering said slugs successively to a point of use.

6. In a machine for automatically extruding a succession of zinc slugs into individual articles, an oven having an elongated channel therethrough, an endless chain having a portion of its course through said oven, means for advancing said chain, means for delivering flat, disc-like slugs edgewise to said chain as it enters said oven, means for receiving the slugs from said chain as it leaves the oven, and means operable upon each cycle of operation of the machine for delivering said slugs successively to a point of use.

7. In an extruding machine, operating means having a predetermined cycle of operation, an oven having an elongated channel therethrough, an endless chain having a portion of its course through said oven, means operated by said operating means for advancing said chain, means for delivering flat, disc-like slugs edgewise to said chain to be advanced thereby as it enters said oven, means for receiving the slugs from said chain as it leaves the oven, and means operable upon each cycle of operation of the machine for delivering said slugs successively to a point of use said advancing means operating said chain at a rate faster than the normal movement of said slugs.

8. In an extruding machine, an oven having an elongated channel therethrough, an endless chain having a portion of its course through said oven, means for advancing said chain, means for delivering flat, disc-like slugs edgewise to said chain as it enters said oven, and means for receiving the slugs from said chain as it leaves the oven, said advancing means operating said chain continuously at a rate faster than the normal rate of advance of said slugs but not faster than required for proper heating of the slugs in said oven.

9. In an extruding machine, an oven formed by a pair of spaced, elongated members providing a narrow passage enlarged at its bottom, a continuously moving conveyor in said enlarged portion of said passage, means for delivering flat, disc-like slugs edgewise to said conveyor, said slugs extending into the narrow portion of said passage, and means for receiving the heated slugs from said oven and delivering the same to the point of use.

10. In an extruding machine, an oven formed by a pair of spaced, elongated members providing a narrow passage enlarged at its bottom, a continuously moving conveyor in said enlarged portion of said passage, means for intermittently delivering flat, disc-like slugs edgewise to said conveyor, said slugs extending into the narrow portion of said passage, and means for receiving the heated slugs from said oven and intermittently delivering the same to the point of use.

11. In apparatus for extruding substantially flat disc-like slugs, a hopper, a substantially horizontal conveyor, means for feeding said slugs to the conveyor at a faster rate than they are carried by said conveyor, a die, and means including devices operated upon each cycle of operation of said operating means for transferring slugs from said conveyor to said die, said conveyor being arranged to urge said slugs toward said transferring means at a faster rate than the slugs are transferred to the die.

12. In a machine for extruding metal slugs into hollow articles, operating means having a predetermined cycle of operation, a hopper for substantially flat, disc-like slugs, a movable conveyor, means for delivering said slugs intermittently from said hopper to said conveyor, means for moving said conveyor and carrying said slugs therewith, a chute for receiving said slugs from the conveyor, and means for delivering the slugs one by one from said chute to a point of use upon successive cycles of operation of the machine.

13. In a machine for extruding metal slugs into hollow articles, a hopper for substantially flat, disc-like slugs, an endless conveyor, means for delivering said slugs intermittently from said hopper edgewise to said conveyor, means for shifting said conveyor and carrying said slugs edgewise thereon, means for heating said slugs while being carried edgewise, a chute for receiving said slugs for the conveyor, and means for delivering the slugs one by one from said chute to a point of use.

14. In a machine of the class described a hopper for substantially flat, disc-like slugs, a conveyor, means for delivering said slugs intermittently from said hopper edgewise to said conveyor, means for shifting said conveyor and carrying said slugs edgewise thereon, heating means associated with said conveyor for heating the slugs in transit, a chute for receiving said slugs from the conveyor, and means for delivering the slugs one by one from said chute to a point of use.

15. In a machine for extruding substantially flat, disc-like slugs into hollow articles, operating means having a predetermined cycle of operation, a hopper for slugs, a die to receive said slugs, means for regulating the feeding of a slug to said die upon each cycle of operation of said machine, and means for automatically supplying slugs from said hopper to said regulating means comprising an endless conveyor moved at a rate faster than the normal feeding of slugs by said regulating means.

16. In a machine for extruding substantially flat, disc-like slugs into hollow articles, operating means having a predetermined cycle of operation, a hopper for slugs, a die to receive said slugs, means for regulating the feeding of a slug to said die upon each cycle of operation of said machine, and means for automatically supplying slugs from said hopper to said regulating means comprising an endless conveyor moved at a rate faster than the normal feeding of slugs by said regulating means and reciprocatory means for delivering slugs from the hopper to said conveyor.

17. In a machine for extruding substantially flat, disc-like slugs into hollow articles, operating means having a predetermined cycle of operation, a hopper for slugs, a die to receive said slugs, and means for automatically supplying slugs from said hopper to said die at a rate faster than the slugs are received by said die comprising an endless conveyor and reciprocatory means for delivering a slug to said die upon each cycle of operation of said machine, after discharge from said conveyor.

18. In a machine for extruding substantially flat, disc-like slugs into hollow articles, operating means having a predetermined cycle of operation, a hopper for slugs, a die to receive said slugs, and means for automatically supplying slugs from said hopper to said die comprising an endless conveyor and reciprocatory means operable upon each cycle of operation of said machine for handling said slugs both before and after they are carried by said conveyor.

19. In a machine for extruding metal slugs into hollow articles, operating means having a predetermined cycle of operation, an oven having an elongated channel therethrough, an endless conveyor traveling through said oven at a predetermined rate, a die, means for delivering slugs to said conveyor at one end of said oven, and means for receiving a slug from said conveyor at the other end of the oven upon each cycle of operation of said machine and transferring said slug to said die.

JOHN H. FRIDÉN.